Jan. 6, 1942.    F. A. HAYES    2,269,020
VARIABLE SPEED POWER TRANSMISSION MECHANISM
Filed Feb. 8, 1933    3 Sheets-Sheet 1
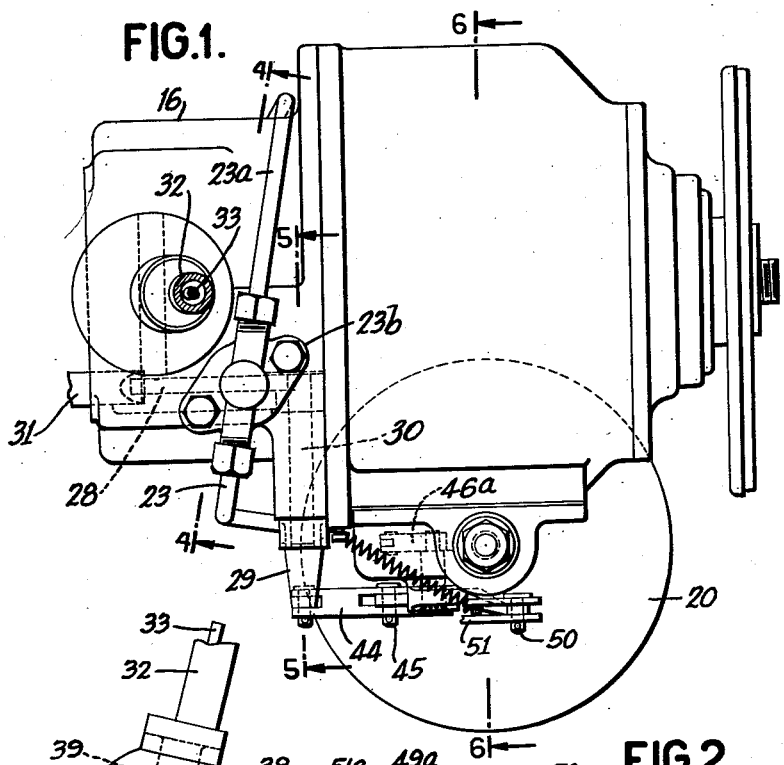
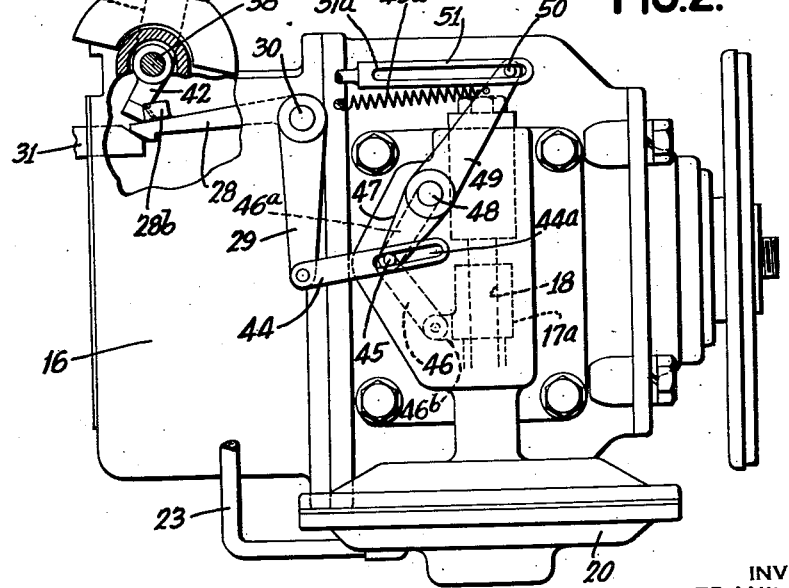
INVENTOR-
FRANK A. HAYES
BY
Cooper, Kerr & Dunham
ATTORNEYS Jan. 6, 1942. F. A. HAYES 2,269,020
VARIABLE SPEED POWER TRANSMISSION MECHANISM
Filed Feb. 8, 1933 3 Sheets-Sheet 2
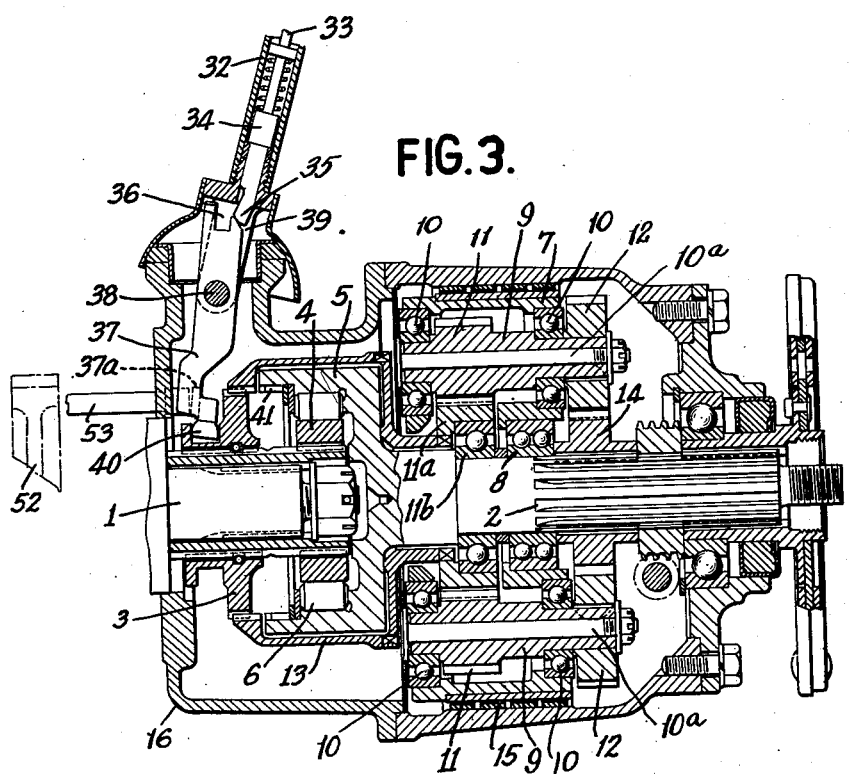
INVENTOR-
FRANK A. HAYES
BY
Cooper, Kerr & Dunham
ATTORNEYS Jan. 6, 1942.    F. A. HAYES    2,269,020
VARIABLE SPEED POWER TRANSMISSION MECHANISM
Filed Feb. 8, 1933    3 Sheets-Sheet 3
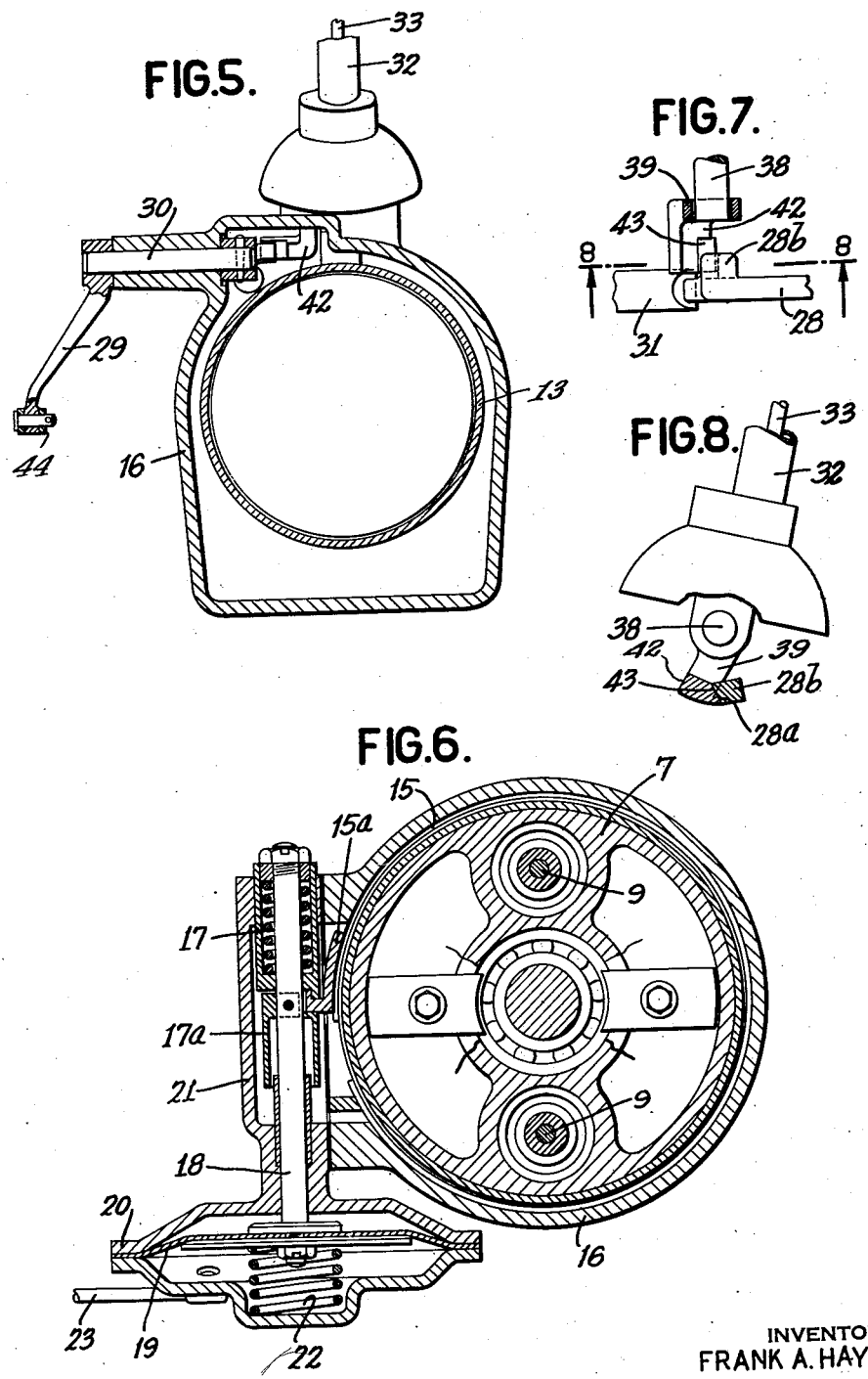
INVENTOR-
FRANK A. HAYES
BY
Cooper, Kerr & Dunham
ATTORNEYS Patented Jan. 6, 1942

2,269,020

UNITED STATES PATENT OFFICE 2,269,020

VARIABLE SPEED POWER TRANSMISSION MECHANISM

Frank A. Hayes, Middletown, N. J.

Application February 8, 1933, Serial No. 655,696
In Great Britain February 19, 1932

14 Claims. (Cl. 74—472)

This invention relates to variable speed power transmission mechanism and has for its chief object to provide a mechanism for motor vehicles, to be used in rear or in front of the conventional sliding-gear mechanism or gear box, giving the driver more than the usual facilities in the matter of gear changes and permitting of high economy in fuel consumption and reduction of noise and vibration. Another object of the invention is to provide a simple and reliable mechanism adapted to operate in conjunction with a free-wheeling device and to be easily added to or embodied with the usual change speed gear box.

In its preferred form the invention is so constructed and arranged that the operator is able to effect a gear change merely by actuating his accelerator pedal much in the manner in which he is accustomed to operate it with conventional types of gear transmissions.

In one constructional embodiment, the invention comprises mechanism contained in a casing supplemental to the gear box and located immediately at the rear of the latter. On the tail or power delivery shaft of the gear box is mounted one member of a free-wheel clutch of the ordinary one-way roller type, the other member being secured to the driven shaft leading to the back axle of the vehicle.

Mounted revolubly around the driven shaft just at the rear of the free-wheel clutch is a planetary member in the form of a drum or cylinder carrying revolubly one or more short shafts set parallel to the main drive and each carrying a pair of pinions. These pinions are thus rotatable on their own axes and revoluble in planetary fashion around the main axis. One pinion of each pair meshes (through suitable intermediate elements) with the power delivery shaft of the gear box and the other meshes with the driven shaft.

Any suitable clutch means, preferably a brake band operated by fluid pressure, are provided to hold the planetary member stationary or to allow it to revolve freely. The gear ratios of the above pinions with their meshing members is such that when the planetary member is held stationary the free-wheel mechanism is idle and the power is transmitted direct from the power-delivery shaft of the gear box through the pinions of the planetary member to the driven gear on the propeller shaft of the vehicle, giving an overdrive or increased speed ratio. If, on the other hand, the band or other brake applied to the planetary member is released the planetary pinions start to revolve about the main axis in the direction of the drive due to the forces acting on them until the speed of the power shaft equals that of the driven or propeller shaft whereupon the free-wheel clutch comes into action and a one-to-one or "direct" drive results. This arrangement provides in effect a very simple two speed transmission, application of the brake-band providing one speed, and release of it providing another speed.

To make the operation simple and more or less instinctive on the part of the car driver, the enging of the brake-band with the planetary member is made to depend upon the releasing of the accelerator pedal and the releasing of the brake-band is made to depend upon full depression of the accelerator pedal. The driver starts his car in the ordinary way with the conventional clutch and transmission, and when he has arrived at high or top (one-to-one) gear on the conventional transmission and has attained the desired car speed, he brings the overdrive into action by releasing his accelerator pedal in the accustomed manner (as he would if he intended to shift gears again) except that he allows it to come all the way up. He then drives the car as usual, with the advantages of high economy and reduced noise and vibration due to the slow engine speed. When road or traffic conditions or other considerations require him to obtain rapid acceleration or increased pull momentarily, he merely depresses the accelerator pedal all the way down—which is the instinctive action under such conditions—whereupon the brake-band of the overdrive gear is immediately released, the free-wheel clutch comes into action and the car is being propelled through its normal "high" gear.

In order that the invention may be clearly understood and readily carried into effect I will now describe the same more fully with reference to the preferred embodiment illustrated in the accompanying drawings in which:

Fig. 1 is a plan view,

Fig. 2 is a side elevation, and

Fig. 3 is a vertical longitudinal section through the novel mechanism supplementing the usual gear box (not shown) and situated immediately to the rear thereof.

Figs. 4, 5 and 6 are sections taken approximately on the lines 4—4, 5—5 and 6—6, respectively, of Fig. 1.

Fig. 7 is a fragmentary detail view, and

Fig. 8 is a section on the line 8—8 of Fig. 7.

Referring first more particularly to Fig. 3, the reference numeral 1 indicates the tail or driven shaft of the usual gear box (transmission mechanism) of a vehicle and 2 indicates the power receiving or propeller shaft leading to the back axle.

The driving or tail-shaft 1 drives a longitudinally slidable clutch member 3, splined on the shaft, and drives also one member 4 of a one-way "free wheel" clutch. The other or driven member 5 of the free wheel clutch is on the forward end of the driven or propeller shaft 2. 6 indicates the rollers between the free-wheel clutch members 4, 5.

7 is a planetary member revolubly mounted on ball bearings 8 on the shaft 2 and carrying two short shafts 9 rotatable in ball bearings 10. Each shaft 9 has at one end a pinion 11 and keyed on the other end a pinion 12 (held in place by bolts 10a passing through the shaft) so that the two pinions are rigidly connected together. Each forward pinion 11 meshes with and is driven by a gear 11a which is mounted in a ball bearing 11b on the driven shaft 2 and is connected to a spider member 13 constituting a clutch-member which bridges or reaches forward over the free wheel clutch 4, 5, and engages at its forward end with the tail-shaft spline member 3, whilst each rear pinion 12 gears directly with and drives a gear 14 on the propeller shaft 2.

The planetary movement of the planetary member 7 carrying the two pairs of pinions 11, 12, is controlled by a brake band 15 embracing the external surface of said member.

16 is a casing enclosing the whole of the above described mechanism.

From the foregoing description it will be understood that the power from the gear box tail-shaft 1 can reach the propeller shaft 2 either direct through the one-way free-wheel clutch 4, 5 or over the latter by the clutch bridging mechanism constituted by the train of members 3, 13, 11, 12 and 14. In the latter case the splined clutch-member 3 drives gear 11a, which drives pinions 11 and 12. The latter pinions then drive the gear 14 if the pinions are prevented from revolving in planetary fashion around the driven shaft.

The free-wheeling clutch gives what may be termed a one-to-one drive, and the planetary gear when active is such as to give what may be termed an over-drive or increased speed ratio. Therefore by applying the brake-band 15, thus preventing planetary revolution of pinions 11, 12, the overdrive traveling speed is obtained. This follows from the fact that gear 11a, driven from the tail-shaft 1, is larger than pinions 11 and that the latter are smaller than pinions 12 which drive the propeller shaft 2.

The over-drive never functions unless the usual gear box is in high gear and the functioning is then subject to accelerator pedal control as will now be described.

One end of the brake band 15 is anchored to the casing 16 and the other end 15a (Fig. 6) is gripped between the lower edge of a spring plunger 17 mounted on a stem 18 and the upper end of a skirt 17a pinned to said stem. The spring plunger 17 permits the diaphragm stem 18 and associated parts to move through a full stroke at all times regardless of wear on the band. The stem 18 carries at its lower end a diaphragm 19 contained in a vacuum chamber 20 at the foot of a stem guide 21 forming a lateral attachment to the casing 16. A spring 22 normally thrusts the diaphragm upwards and thereby keeps the brake band 15 in its slack or released position but the diaphragm can be pulled down by the suction of the engine (not shown) operating on the underside of the diaphragm through a pipe 23, 23a.

In the path of the engine suction acting through the pipes 23, 23a is a double-faced valve 24 (Fig. 4) floating between two springs 25 and 26. The latter is housed in an inverted cup extending downwardly from the valve and bears against a small plunger 27. The valve is housed in the casing 23b, shown in Figs. 1 and 4 but omitted in Fig. 2 to avoid complication. The stronger spring 25 tends to keep the valve 24 seated in the position shown in Fig. 4, in which position the suction of the engine can take effect along the pipes 23, 23a past the valve. The weaker spring 26 however is compressible to become stronger than spring 25 by the plunger 27 the stem of which rides on one arm 28 of a bell crank lever (Fig. 1) comprising the arms 28 and 29 and the shaft 30. When the arm 28 is raised the valve 24 is raised into its alternative position in which the suction of the engine in pipe 23a can not reach the diaphragm chamber 20 and air is admitted through an air port 24a to the pipe 23 to relieve the vacuum under the diaphragm 19 in chamber 20.

The bell crank lever 28, 29, 30, is held in the position in which its arm 28 keeps the valve 24 in the raised position until high gear condition is established in the gear box as will now be explained. Referring to Fig. 2 it will be seen that the free end of the arm 28 is beveled and rests upon the beveled end of a rod 31. This rod 31 is the shift rod in the adjacent transmission mechanism, which may be of the conventional sliding gear type, one gear of which is indicated in dotted lines at 52, Fig. 3. When the transmission is in any lower gear condition than high gear the rod 31 extends further to the right than is shown in Fig. 2 and the arm 28 is therefore raised by the cam-action of the cooperating bevels on the arm and rod, but when high gear condition is established in the gear box or transmission mechanism the rod 31 and the arm 28 assume the position shown and the engine suction can therefore take effect through the pipes 23, 23a and under the diaphragm 19, thereby depressing stem 18, Fig. 6, and clamping the brake band 15 down on the planetary element 7 to produce the "over-drive" described above.

The various possible conditions available by means of the mechanism above described are rendered selective at the option of the vehicle driver. For this purpose an articulated manual control lever 32 (Figs. 1 and 2) is provided for operation by the operator of the vehicle by the mere movement of which lever, into one or other of three positions, one or other of the following driving conditions will be established, namely (1) the possibility of "over-drive," (2) ordinary gear box drive combined with free-wheeling, and (3) ordinary gear box drive without the possibility of free-wheeling. The said control lever 32 is hollow and contains a rod 33 (Fig. 3) terminating at its lower end in a spring pressed plunger 34 having a bolt-like extension 35 engaged with the forked upper end 36 of a lever 37 fulcrumed on a shaft 38. The control lever itself is also movable about the shaft 38 on which it is fulcrumed by a lug 39. The lower end of the lever 37, operable by the articulated control lever, is formed with a toe piece 40 engaging in a circumferential groove or track on the tail shaft spline member 3 so that when the lever 37 is rocked counter-clockwise, the clutch member 3 is shifted rearwardly along the tail-shaft 1 into engagement with teeth 41 on the outer member 5 of the one-way free-wheel clutch without being disengaged from the similar teeth on the bridge or clutch member 13.

The lug 39 of the tubular control lever 32 has a downwardly and laterally extending piece 42 having an inclined face 43 (Figs. 7 and 8) adapted to engage with an inclined undercut face 28a on a lateral projection 28b formed on the arm 28 of the bell crank lever 28, 29, 30. Consequently when the control bar 32 is rocked counterclockwise from the position shown in Fig. 2 the inclined face 43 of the piece 42 will press upon the inclined undercut face 28a and tilt the arm 28 in the same manner and with the same effect as the gear-shifting rod 31 tilts it when shifted to the right out of top-gear position.

It is to be observed that the arm 28 (Fig. 2) of the bell crank lever 28, 29, 30, is inside the casing 16 whereas the arm 29 is outside the casing. The lower end of the arm 29 is connected to a floating link 44 having a slot 44a engaging the pin 45 of a toggle linkage 46, 46a inside the casing. The link 46 is connected at its lower end to a lug 46b on the skirt 17a on the diaphragm stem 18. The link 46a is fixed to the inner end of a shaft 48 to the outer end of which is fixed a lever whose lower arm 47 carries the pin 45 and whose upper arm 49 is connected by a pin 50 to a slotted bar 51 connected at its other end to the accelerator pedal or other engine-throttle actuating device, not shown. Straightening of the toggle linkage is therefore coincident with tightening of the brake band upon the planetary member. The toggle linkage is in fact pulled slightly beyond its dead center position by a spring such as 49a and the brake band when applied therefore remains applied until the toggle joint is broken.

With the control lever or bar 32 in the position shown it will be understood that when starting from rest the gear shifting rod 31 will be extending under the arm 28 so that valve 24 (Fig. 4) will be in its upper position and the suction of the engine will be interrupted in the pipes 23, 23a. The brake band 15 on the planetary member 7 will therefore be slack. When, however, change into high or top gear is effected the rod 31 takes its leftward position, shown in Fig. 2, and the bell crank lever 28, 29, 30 then rocks and allows the valve 24 to close the air port 24a and permit the engine suction to act on the diaphragm. When the engine suction pulls down the diaphragm the skirt 17a moves with it and causes the toggle linkage (46, 46a) to straighten and in fact pass just beyond the dead center position where it will remain until forcibly shifted, thus keeping the brake band applied. The shifting of the toggle linkage from its locked position is brought about in either of two ways. If the manual control lever 32 is rocked into the vertical position the inclined face 43 of the extension 42 acts on the inclined lug 28b on arm 28 and raises the latter, thereby causing the vacuum to cease acting on the diaphragm 19 and simultaneously causing the arm 29 to pull on the pin 45 through the link 44 and unlock the toggle joint. Alternatively if the slotted throttle bar 51 is moved to its full extent to the right by depression of the accelerator pedal the end 51a of its slot will eventually rock the lever 49 and unlock the toggle joint. The length of the slot in the bar 51 and its position relatively to the lever movement is such that the lever is rocked only during the final portion of the movement of the throttle bar 51 towards the right. This movement of the throttle bar to the right corresponds to depression of the accelerator pedal.

If the rod 33 in the manual control lever 32 is retracted against the spring pressure of its plunger 34 and the lever be rocked counterclockwise, the bolt-piece 35 can be made to engage in and become locked to the forked end of the lever 37. This movement of the control bar or lever will also cause its extension 42 to raise the arm 28 as already described with reference to Figs. 7 and 8 so that the engine suction can not act on the diaphragm 19 and the overdrive can not operate.

Finally, if the control lever be rocked still further in the counterclockwise direction the toe-piece 40 will shift the tail-shaft splined clutch member 3 as already described.

For reverse drive of the vehicle the usual change is effected in the ordinary gear box and the rearward shift of a gear wheel 52 therein (Fig. 3) causes a distance rod 53 to strike a lug 37a on the lever 37 and thereby cause the toe-piece 40 to shift the sliding clutch member 3 entirely out of mesh with the clutch-member 13 of the gear 11a and into mesh with the teeth 41 on the clutch member 5 thus disabling the planetary gear mechanism and cutting out the free-wheeling clutch.

It will be seen that this transmission provides all of the advantages of free-wheeling, i. e. easy shifting, free coasting, silent operation and saving of fuel when coasting, with the great additional advantage of silent operation and high economy for driving at moderate speed in level country.

A further advantage lies in the fact that the customer may be provided with a gear ratio in the over-drive transmission to suit his particular requirements, i. e. for the driver who likes to cruise at forty miles an hour in the open country one ratio will be provided which will give him a moderate increase in economy and quietness, while for the driver who is satisfied to cruise at thirty miles an hour a much higher ratio will be supplied, resulting in a considerable increase in economy and quiet running. The transmission is so designed that the different gear ratios may be stocked by car dealers and thus enable the change to be readily and cheaply made.

Although one constructional embodiment of my invention has been described and illustrated in detail it is to be understood that the invention can be embodied in other forms without departure from its spirit.

I claim:

1. Variable speed power transmission mechanism for motor vehicles comprising the combination with the usual clutch and gear box, of a free wheel clutch between the tail or power delivery shaft of the gear box and the driven or power receiving shaft, and a planetary gear mechanism bridging said free wheel clutch, the gear ratios being such that when the planetary member of the gear is held stationary the free wheel is idle and the power is transmitted at increased speed ratio direct through said mechanism whereas said planetary member when released revolves around the main axis until the speed of the power delivery shaft equals that of the power receiving shaft whereupon the free wheel clutch comes into action and a one-to-one drive results.

2. Variable speed power transmission mechanism according to claim 1 in which the holding and release of the planetary member is dependent upon movements of the vehicle accelerator pedal.

3. Variable speed power transmission mechanism according to claim 1 in which the means for holding or releasing the planetary member consists of a brake band actuated by fluid pressure in response to variations of engine suction resulting from actuation of the engine-throttle actuating device.

4. Variable speed power transmission mechanism according to claim 1, including a manual control lever, means operable by the lever to disable the free-wheel clutch, and means operable by the lever to prevent revolution of the planetary member.

5. Variable speed power transmission mechanism for a motor vehicle having a clutch, change-speed mechanism, and an engine provided with a throttle, comprising the combination of a free wheel clutch between the power-delivery or tail-shaft of the change-speed mechanism and a driven or power-receiving shaft, planetary gear mechanism to bridge the free wheel clutch, a brake band to cooperate with said gear mechanism to prevent planetary revolution thereof, fluid-pressure means adapted to be operated by engine suction to actuate said brake band, valve means for controlling the fluid pressure, and an operator-operable lever to control said valve.

6. Variable speed power transmission mechanism according to claim 1, in which a member responsive to gear changes in the gear box operates to prevent the holding of the planetary gear mechanism unless the gear box condition is in high gear.

7. Variable speed power transmission mechanism according to claim 1, having in combination, means for holding the planetary gear mechanism to render it effective, means for locking said holding means in effective position, and means for unlocking the same at will.

8. Variable speed power transmission mechanism for a motor vehicle having a clutch, change-speed mechanism, and an engine provided with a throttle, comprising the combination of a free wheel clutch between the power-delivery or tail-shaft of the change-speed mechanism and a driven or power-receiving shaft, planetary gear mechanism to bridge the free wheel clutch, means operable to hold said gear mechanism to prevent planetary revolution thereof, automatic toggle means for locking said holding means in holding position, and means for unlocking the same at will.

9. Variable speed power transmission mechanism for a motor vehicle having a clutch, change-speed mechanism, and an engine provided with a throttle and actuating means therefor, comprising the combination of a free wheel clutch between the power-delivery or tail-shaft of the change-speed mechanism and a driven or power-receiving shaft, planetary gear mechanism for bridging the free wheel clutch, means operable to hold said gear mechanism to prevent planetary revolution thereof, fluid-pressure means operated by engine suction to actuate said brake band, valve means for controlling the fluid pressure, automatic locking mechanism for said holding means, lost-motion linkage adapted to be connected with the throttle-actuating means for operation thereby to unlock said locking mechanism, a control lever, and linkage connecting the lever with the locking mechanism to unlock the same when the lever is actuated.

10. In a variable speed power transmission mechanism for a motor vehicle having an engine, in combination, a driving shaft, a driven shaft, a free wheel clutch having a driving member connected with the driving shaft and a driven member connected with the driven shaft to provide a predetermined driving speed ratio between said shafts, planetary gear mechanism connected with the driven shaft to drive the latter at a higher speed ratio, a clutch member connected with the planetary gear mechanism, a clutch member slidable on the driving shaft to engage at will either the clutch member of the planetary gear mechanism and the driven clutch member of the free wheel clutch simultaneously or the former alone, operator-operated means for shifting the slidable clutch member, and operator-controlled automatic means operable to prevent revolution of the planetary gear mechanism when the clutch member thereof is engaged by the said slidable clutch-member.

11. In a variable speed power transmission mechanism for a motor vehicle having an engine, in combination, a driving shaft, a driven shaft, a free wheel clutch having a driving clutch-member connected with the driving shaft and a driven clutch-member connected with the driven shaft, planetary gearing revoluble about the driven shaft and having driving and driven pinions, a driving gear meshing with the driven pinions to drive the same, a gear on the driven shaft and meshing with the driving pinions to drive the driven shaft, a clutch-member connected with the first-mentioned gear, a clutch-member slidable on the driving shaft to connect the latter to the driven clutch-member of the free wheel clutch and to the said driving gear clutch-member simultaneously or to the former alone, automatic mechanism operable to prevent revolution of the planetary gearing, operator-operated means to control said automatic mechanism, and means actuated by said control means to shift the slidable clutch-member.

12. A change-speed gear for automobiles having an engine and a throttle-actuating device, comprising in combination, a gear transmission provided with means for varying its speed ratio and having a tail shaft; and a supplementary transmission having a shaft to be driven, a free wheel clutch for operatively connecting said shafts to provide a 1:1 ratio, gear mechanism for bridging the free wheel clutch to provide an overdrive ratio, a clutch member to connect one element to the overdrive gear mechanism with said tail shaft and shiftable to lock the free wheel clutch, and means controllable by operation of the engine throttle-actuating device to render the overdrive gear mechanism operative.

13. A transmission of the character described, including: a drive member; a driven member; primary driving means for connecting said drive member to said driven member so as to rotate said driven member at a speed proportionate to the speed of said drive member, said primary driving means including a one-way clutch and a direct drive clutch; means for engaging said direct drive clutch; secondary driving means adapted to connect said drive and driven members so as to drive said driven member at a speed greater than the speed at which said driven member is driven through said primary driving means, said secondary driving means including an engaging element; means for operating said element of said secondary driving means; and means for preventing actuation of said element when said direct drive clutch is engaged.

14. A change-speed gear for automobiles comprising in combination a gear transmission provided with means for varying its speed ratio and having a tail shaft, a shaft to be driven from said tail shaft, a free wheel clutch for operatively connecting said shafts to provide a 1:1 ratio between the same, gear mechanism for bridging the free wheel clutch to provide an overdrive ratio, means for locking the free wheel clutch, and fluid-pressure operated means cooperable with the overdrive gear mechanism to render the overdrive gear mechanism operative.

FRANK A. HAYES.